United States Patent [19]

Powderley

[11] 4,044,591

[45] Aug. 30, 1977

[54] BLIND RIVET AND IMPROVED METHOD OF BLIND RIVETING

[75] Inventor: John Powderley, Birmingham, England

[73] Assignee: USM Corporation, Boston, Mass.

[21] Appl. No.: 700,909

[22] Filed: June 29, 1976

[30] Foreign Application Priority Data

July 23, 1975 United Kingdom ............... 30725/75

[51] Int. Cl.² ......................... B21J 15/34; F16B 21/00
[52] U.S. Cl. .......................................... 72/391; 85/77
[58] Field of Search ................ 72/391, 367, 369, 370; 85/77, 78

[56] References Cited

U.S. PATENT DOCUMENTS

| 3,038,626 | 6/1962 | Simmons | 85/78 |
| 3,136,204 | 6/1964 | Reynolds | 85/77 |
| 3,489,056 | 1/1970 | Blakeley | 85/78 |

FOREIGN PATENT DOCUMENTS

| 930,577 | 7/1973 | Canada | 85/77 |
| 41,300 | 10/1964 | Japan | 85/78 |
| 602,652 | 5/1948 | United Kingdom | 85/77 |

*Primary Examiner*—Lowell A. Larson
*Assistant Examiner*—Gene P. Crosby
*Attorney, Agent, or Firm*—Carl E. Johnson; Richard B. Megley; Vincent A. White

[57] ABSTRACT

For use in pull-through blind riveting a plurality of tubular rivets is received on a reusable mandrel having a head and a stem, each rivet having a recess in its tail end which can accommodate a ring of metal separated by the mandrel head from the internal wall of the rivet set in a previous rivet-setting operation. Dimensions of the mandrel and its rivets insure that a complete ring rather than a crescent-shaped fragment is removed from the rivet being set, and this ring is caused to be retained in the recess of the next rivet to be set by the mandrel. In practicing the novel method, the separated ring of rivet metal is retained on the mandrel stem until the mandrel head is pulled through the ring in setting the next rivet.

6 Claims, 3 Drawing Figures

BLIND RIVET AND IMPROVED METHOD OF BLIND RIVETING

BACKGROUND OF THE INVENTION

This invention is concerned with improvements in or relating to blind riveting. The expression "blind riveting" is used herein to denote a procedure in which a tubular rivet inserted into a hole in a workpiece from one side is set by radial expansion of a tubular portion of the rivet at the other side of the workpiece by pulling through the rivet a head of a mandrel which is too large to pass through the tubular portion of the rivet without deforming it. Setting of a rivet in blind riveting by customary procedures sometimes results in the mandrel breaking, the mandrel head being either retained in the set rivet or falling away at the blind side of the workpiece, or by the mandrel being pulled right through and clear of the rivet so that the mandrel can be used again and again. In the latter case, commonly referred to as "pull-through blind riveting", it is customary to use a long mandrel with a number of, for example 25, rivets on it, the mandrel being mounted in a suitable tool and the rivet set upon reciprocation of the mandrel and forward feeding of the rivets.

Blind pull-through mandrel rivets are disclosed, for example, in British patent specification No. 1,323,873 based on an application filed July 28, 1969. The use of expendable mandrels in blind riveting, that is to say where the mandrel breaks and can therefore by used for only one setting operation, is relatively expensive, but the performance of the set rivet, including the ability of the rivet to pull together the parts of the workpiece and clench them tightly, is usually considered superior to that which has yet been achieved with pull-through blind riveting. There are, however, many occasions where the performance of a rivet set by pull-through blind riveting is adequate for the particular purpose it is to serve, provided that a high standard of consistency and reliability can be achieved.

In blind riveting, where two or more sheets are to be riveted together, it is necessary to ensure that radial expansion of the tail-end of the rivet takes place to engage the blind side of the workpiece before sufficient expansion of an intermediate portion of the rivet shank occurs to hold the sheets apart, and that radial expansion and longitudinal contraction of the intermediate portion of the shank takes place subsequently. With some shapes of rivet, the size of the mandrel head necessary to achieve this effect is such that when it is pulled right through the rivet it is likely that a small amount of material of the wall of the rivet will either be completely removed from the rivet or will appear as a burr around the rivet wall projecting in an unseemly manner from the set rivet after completion of the operation. If such material remains attached to the rivet its appearance is unsightly; if it is removed by the mandrel, it will fall off at some unpredictable time and possibly become trapped inside the rivet-setting tool, which can become especially troublesome if the tool being used is one with hydraulic seals.

SUMMARY OF THE INVENTION

It is one of the various objects of the present invention to provide an improved method of pull-through blind riveting wherein the risk of small pieces of metal separated from the wall of the rivet being unsightly or becoming troublesome is at least largely avoided.

It is another of the various objects of the present invention to provide an improved tubular rivet suitable for use in pull-through blind riveting.

There is hereinafter described in detail to illustrate the invention by way of example a method of pull-through blind riveting wherein a tubular rivet is used which has a recess at a tail end thereof which can accomodate a ring of metal separated by the mandrel from a rivet in a previous rivet-setting operation. The mandrel and rivet used in carrying out this illustrative method are so dimensioned as to ensure that a complete ring, and not merely a crescent-shaped piece or other fragment of metal, is removed from each rivet on being set by the mandrel, such ring being deposited within the recess at the tail end of the next rivet to be set, and retained therein sufficiently firmly for it not to fall out at the blind side of the work.

Two tubular rivets suitable for use in carrying out the illustrative method are also described in detail to illustrate the invention in its rivet aspects. The recess at the tail end of each rivet has a flared mouth to facilitate entry thereinto of the ring of metal separated from the rivet in a previous rivet-setting operation.

In carrying out the illustrative method, consistent and reliable blind riveting can be achieved with little or no risk of small pieces of metal thus separated from the wall of the rivet being unsightly or troublesome.

The invention provides, in one of its several aspects, a method of blind riveting wherein the heat of the mandrel is pulled through a succession of rivets, a ring of metal being separated from each rivet by the mandrel head and being retained on the mandrel stem until the mandrel head is pulled through it in the setting of the next rivet.

The invention also provides, in another of its several aspects, a tubular rivet suitable for use in blind riveting and having an enlarged bore at a tail end thereof with a flared mouth to accommodate a ring of metal removed by the mandrel in setting a previous rivet.

BRIEF DESCRIPTION OF THE DRAWINGS

The above and other of the various objects and several aspects of the invention will become more clear from the following description, to be read with reference to the accompanying drawings, of the illustrative method and illustrative rivet aforementioned. It will be appreciated that this illustrative method and the illustrative rivets have been selected from description by way of example and not of limitation of the invention.

In the accompanying drawings.

DESCRIPTION OF PREFERRED EMBODIMENTS

Figure 1:
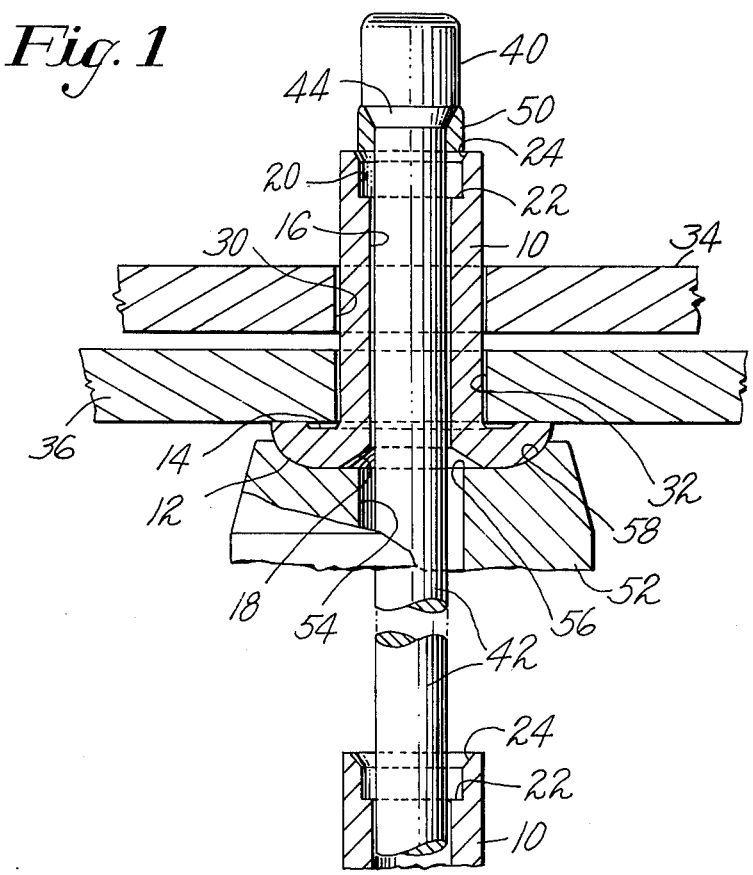
FIG. 1 is a view in longitudinal section through a first one of the illustrative blind rivets, showing workpieces in which it is going to be set and a nosepiece of a representative setting tool.

The first illustrative rivet (FIG. 1) has a tubular shank 10 and a head flange 12. An annular groove 14 on the underside of the flange surrounds the shank 10. A bore 16 extends through the rivet, opening out as a frusto-conical surface 18 at the head flange end; the surface 18 extends substantially to above half the depth of the flange 12.

At its tail end, the illustrative rivet 10 has a recess 20 defined by a cylindrical wall, terminating at an annular shoulder 22 perpendicular to the axis of the bore 16. The depth of the recess 20 is about one third of the outer diameter of the rivet shank 10. At its open end, the recess 20 is bevelled, to provide a flared mouth 24.

The illustrative rivet is desirable made of aluminum alloy (for instance 95% aluminum, 5% magnesium). Other materials may alternatively also be used.

In carrying out the illustrative method of blind riveting, the rivet shank 10 is inserted into aligned holes 30, 32 in two sheets 34, 36 of a workpiece, and set at the blind side (i.e. the side of the workpiece opposite that against which, on insertion, the head flange 12 comes to bear) by means of a mandrel having a head 40 and a stem 42. The mandrel stem 42 is reciprocably captive, in a conventional manner, in a suitable blind-rivet setting tool of which a nose-piece 52 only is shown in FIG. 1. The nosepiece 52 (which customarily is of a known, longitudinally split, expansible jaw type to enable a rivet to be relatively fed forwardly along the mandrel stem between rivet-setting operations) has a cylindrical bore 54 which has a diameter in the range of from one twentieth to one tenth greater than that of the mandrel head 40, and a sharp circular edge 56 between the bore 54 and an abutment surface 58 complementary in shape to the rivet head flange 12.

The head of the mandrel 40 used in carrying out the illustrative method is cylindrical with a frustoconical annular surface 44 under the head 40. The included angle of the surface 44 is about 60° as depicted in FIG. 1; an angle between 45° and 90° is suitable. As shown in FIG. 1 the head 40 has already been used in a pull-through rivet-setting operation, and accordingly has, around its stem under the head 40, a ring 50 of metal which was separated from the interior wall of the previously set rivet.

Figure 2:
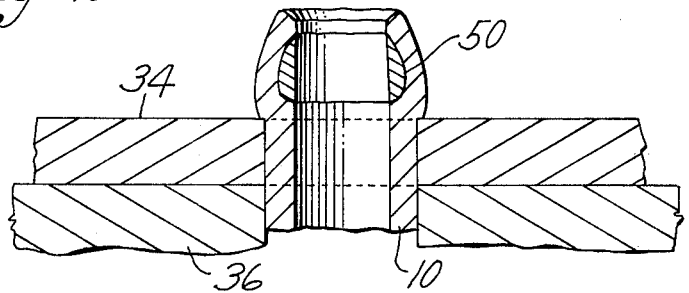
FIG. 2 shows, in section, a tail end portion of the set rivet.

In carrying out the illustrative method, the mandrel head is pulled axially right through the rivet and into the bore 54 of the nosepiece. Initially in a rivet-setting stroke, the mandrel head draws the previously separated ring 50 into the shank recess 20 (if it is not already there), such introduction being facilitated by the flared mouth 24 of the recess. The ring 50 thus becomes seated on the shoulder 22. Further axial retractive pulling to effect relative movement of the mandrel causes the rivet shank to spread radially against the periphery of the hole 30 at the blind side of the workpiece, whereafter, on continued pulling of the mandrel stem, the sheets, 34, 36 are drawn together and clenched by the rivet. The ring 50 becomes compressed and distorted as the mandrel head is drawn through it and remains captive in the consequently deformed tail end portion of the rivet (see FIG. 2).

The rivet shank 10 is expanded radially by the mandrel head 40 as it is pulled through, metal flowing in front of the head causing the conical-shaped recess defined by the surface 18 to be filled up, and a surplus ring of rivet metal (not shown, but of substantially the same shape as the ring 50 separated from the previous rivet) to be extruded along the bore 54 around the stem 42 and eventually to be sheared from an inner rim of the head flange 12.

In carrying out the illustrative method, the ring 50 of metal is substantial enough to be retained on the mandrel stem after the setting operation of the rivet, and where, as is customary, another rivet is already on the stem waiting to be pushed through the nosepiece and up to the mandrel head for another rivet-setting operation, there is no risk of the surplus metal remaining on the rivet head flange to present an unsightly appearance nor any risk of its being lost and causing possible damage, for example to the rivetsetting tool. Where a recess, such as the recess 20 in the first illustrative rivet, is provided in the next rivet to be set, the ring remains captive therein and does not fall out at the blind side of the workpiece.

Figure 3:
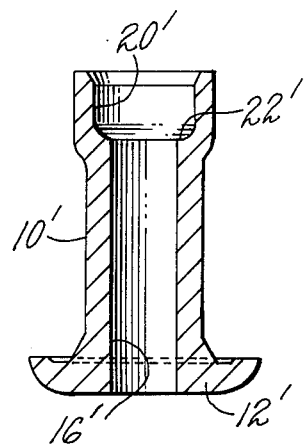
FIG. 3 is a view in longitudinal section of a second illustrative blind rivet.

The second illustrative rivet is shown in FIG. 3, where the same reference numerals, suffixed by a prime accent, are used to denote similar parts. This rivet has a shank 10' which is of reduced external diameter over part of its length between a frustoconical surface 60 under a head flange 12' and a wall around a recess 20' with a flared mouth 24'. The bore 16' of the rivet is cylindrical and of uniform diameter from a shoulder 22' (where it joins the recess 20') to the head flange end of the rivet.

The second illustrative rivet is set by means of a similar mandrel and nosepiece as have been described with reference to the first illustrative rivet, to give a similar result in which a ring of metal separated from a previous rivet becomes captive in the recess of the next one to be set.

Having thus described my invention, what I claim as new and desire to secure by Letters Patent of the United States is:

1. A method of blind riveting wherein a headed mandrel is pulled by its stem through a succession of axially aligned tubular rivets, a ring of material being separated from the interior of each rivet by the mandrel head and being retained on the mandrel stem until the mandrel head is pulled through the ring in the setting of the next rivet in the succession.

2. A method according to claim 1 wherein the pulling of the head through the separated ring material is effective to lodge it in a recess in the tail end of a next rivet on the stem and to expand the wall circumferentially defining said recess.

3. A method of blind riveting workpieces having aligned holes by means of a reusable mandrel slidably carrying thereon at least one of a series of tubular metal rivets respectively having a flanged head end and a tail end and being arranged with the trailing head of one rivet adjacent to the leading tail end of another rivet, the tail ends respectively having an axial recess and the mandrel having a setting head substantially of the same diameter as the recess but slightly larger in diameter than that of the bore of the rivet, the method comprising inserting the leading rivet tail end through the aligned holes with the mandrel advanced to project at least partly beyond said tail end, and while the flanged end of the leading rivet is urged into abutment with one of the workpieces, pulling the mandrel head through the rivet bore to cause said head and a ring of rivet metal separated thereby from the interior of a rivet previously set to relative retraction of the mandrel to set said leading rivet tail end and deposit a ring of rivet metal drawn from the interior wall of the rivet being set into or adjacent to the tail end recess of the rivet next on said mandrel to be set thereby.

4. The method of claim 3 wherein the mandrel head employed is cylindrical and formed with a frustoconical surface merging with a stem of the mandrel, and the mandrel is pulled coaxially through the bore of the rivet being set and then further to move the head into the coaxial bore of the nosepiece of a tool for relatively advancing and retracting the mandrel in successive riveting operations.

5. For use in pull-through blind riveting, a tubular rivet having a flange head end, a tail end to be radially expanded by a mandrel retractable axially in the bore interconnecting said ends, the tail end having a recess defined by a circumferentially chamfered mouth, and a cylindrical wall terminating at an inner annular shoulder perpendicular to the axis of said bore, said tail end recess having a volume sufficient to accommodate rivet metal removed by the mandrel in setting a like prior rivet.

6. A rivet as in claim 5 wherein the recess of the tail end is formed coaxial with the bore and of circular shape to receive a ring of metal removed from the interior of a like prior rivet when it is axially upset by the mandrel.

* * * * *

UNITED STATES PATENT OFFICE
CERTIFICATE OF CORRECTION

Patent No. 4,044,591     Dated August 30, 1977

Inventor(s) John Powderley

It is certified that error appears in the above-identified patent and that said Letters Patent are hereby corrected as shown below:

Column 4, Claim 3, line 18, delete "to" first occurrence and insert -- by --.

Signed and Sealed this

Twentieth Day of December 1977

[SEAL]

Attest:

RUTH C. MASON
Attesting Officer

LUTRELLE F. PARKER
Acting Commissioner of Patents and Trademarks